Dec. 29, 1936.  E. A. SPERRY, JR  2,065,625
METHOD FOR TESTING LUBRICANTS
Filed Feb. 13, 1935

INVENTOR
Elmer A. Sperry, Jr.
BY
Joseph N. Lipschutz
ATTORNEY

Patented Dec. 29, 1936

2,065,625

UNITED STATES PATENT OFFICE 2,065,625

METHOD FOR TESTING LUBRICANTS

Elmer A. Sperry, Jr., Brooklyn, N. Y., assignor to Sperry Products, Inc., Brooklyn, N. Y., a corporation of New York Application February 13, 1935, Serial No. 6,338

6 Claims. (Cl. 73—51)

This invention relates to a method of determining the lubricating qualities of liquids. It consists in placing the liquid on the rim of a disk, rotating the disk so that centrifugal force will move the molecules of liquid toward the edge of the disk, and finally throw the molecules off into space if the ability of the liquid to stick to the metal disk is not great enough. This ability of a liquid to stick to a metal surface is the measure of its lubricity.

Further objects and advantages of this invention will become apparent in the following detailed description thereof.

In the accompanying drawing.

Figures 1, 2:
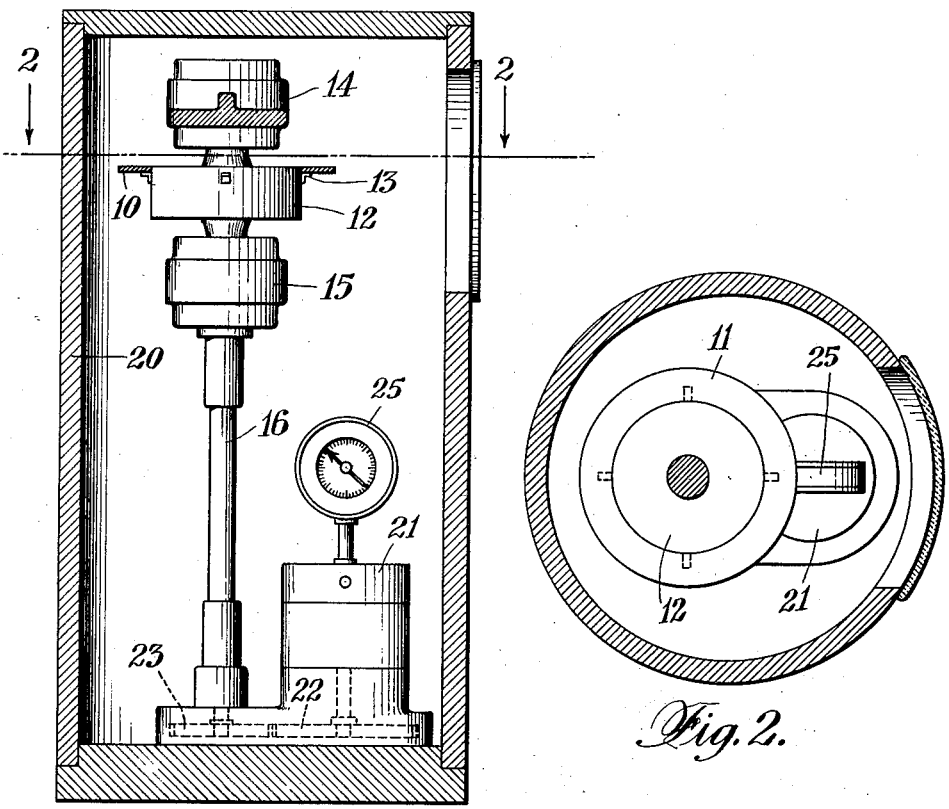
Fig. 1 is a vertical section through the instrument casing, disclosing the front elevation of the testing apparatus.
Fig. 2 is a section taken along the line 2—2 of Fig. 1.

It is well known that when oil is applied to a surface in any quantity, there are two distinct regions of lubrication. There is, first, the region comprising the surface of the material being lubricated and the film of oil in immediate contact therewith, and, secondly, there is the region comprising the several layers of oil. In the first case, the molecules of oil adhere to the material being lubricated, that is, the metal, and in the second case, the molecules of oil adhere to other molecules of oil. Lubricity is a measure of the force with which the molecules of oil are attached to the metal, while viscosity measures the force with which the molecules of oil adhere to adjacent molecules of oil. The forces of the former are very much greater than the forces of viscosity, and in the following description there is disclosed an apparatus for measuring the said forces of lubricity.

To accomplish the purpose of determining the lubricating qualities of a liquid, I have disclosed a testing disk 10 in the form of a thin rim 11 which surrounds a large central perforation. The said disk may be mounted in any suitable manner upon a rotary means, and the specific means here shown comprises a support 12 having flange members 13 upon which the disk is adapted to rest, said support 12 being carried upon a shaft 16 supported in upper and lower bearings 14 and 15, which are fixed. Within an enclosing casing 20, said shaft 16 and the disk supported thereby may be rotated by any suitable means, such as motor 21, connected to driving shaft 16, through means such as gearing 22, 23. The speed of motor 21 may be indicated upon a tachometer 25.

In operation, oil is applied to the upper surface of disk 10, and shaft 16 and disk 10 are then rotated at high speeds of the order of 10,000 and 15,000 revolutions per minute until the lubricant on the upper surface of said disk has been thrown off. In order to be sure that only the film which is in lubricating relation to the disk is being employed, an initial run may be made at a relatively low speed, say, 5,000 revolutions per minute, at which speed it is certain that all viscously held oil has been thrown off. Then the disk and the remaining lubricant are weighed, and the speed is increased to, say, 10,000 revolutions per minute. When no further oil is thrown off, the disk and the remaining lubricant are weighed, and then the disk is reapplied to support 12 and rotated at increased speed, say, 12,000 revolutions per minute. This process is continued until further stepping-up of the speed does not result in any further diminution of weight of the disk; in other words, until the curve of weight against revolutions per minute has flattened out. If a very thin film is applied to disk 10 to begin with, the initial run at low speed to throw off viscously-held oil is unnecessary, since it is certain that only oil which is held in lubricating relation to the disk is to be found on said disk.

In the above statement of operation, it will be seen that the centrifugal force which is generated tends to move the particles of oil out to the outer edge of the rim 11. Such movement requires relatively little force since the molecules of oil are at the same distance from the disk throughout this movement and by Coulomb's law the force of attraction between the molecule of oil and the disk remains constant. When the particles of oil reach the rim 11, if said force is then sufficient to overcome the attraction between the said particles of oil and the disk, the particles of oil will be detached and flung into space. If, however, the centrifugal force is insufficient to overcome the attraction between the lubricant and the surface of said disk, then the lubricant will remain on the disk, as will be determined by weighing same at the end of the run.

In accordance with the provisions of the patent statutes, I have herein described the steps of my method, together with the apparatus which I now consider to represent the preferred means in practicing the same, but I desire to have it understood that the apparatus shown is only illustrative and that the method can be carried out by other equivalent means.

Having described my invention, what I claim and desire to secure by Letters Patent is:

1. The method of determining the lubricating properties of a liquid which consists in applying the liquid to the face of a disk, rotating said disk, and weighing said disk before and after rotating.

2. The method of determining the lubricating properties of a liquid which consists in applying the liquid to the face of a disk, rotating said disk at a plurality of successively increasing speeds, and weighing said disk before and after rotating at each of said speeds, the rotation at each speed continuing until substantially no further liquid is thrown off.

3. The method of determining the lubricating properties of a liquid which consists in applying the liquid to the face of a disk, rotating said disk at a plurality of successively increasing speeds, and weighing said disk before and after rotating at each of said speeds, the rotation at each speed continuing until substantially no further liquid is thrown off and the speeds being increased until the liquid remaining on the disk approaches a constant.

4. The method of determining the lubricating properties of a liquid which consists in weighing a disk, coating the face of the disk with the liquid to be tested, rotating the disk, and determining the amount of liquid remaining on the disk after rotating.

5. The method of determining the lubricating properties of a liquid which consists in weighing a disk, coating the face of the disk with liquid to be tested, rotating the disk at a predetermined speed until no further liquid is thrown off, and determining the amount of liquid remaining on said disk.

6. The method of determining the lubricating properties of a liquid which consists in weighing a disk, coating the face of the disk with liquid to be tested, rotating the disk at a plurality of predetermined speeds until no further liquid is thrown off at each of the respective speeds, and determining the amount of liquid remaining on said disk after rotating at each of said respective speeds.

ELMER A. SPERRY, Jr.